United States Patent
Sarwar et al.

(10) Patent No.: US 10,670,385 B2
(45) Date of Patent: Jun. 2, 2020

(54) METHOD AND APPARATUS FOR MONITORING A ROTATABLE MEMBER

(71) Applicant: GM Global Technology Operations LLC, Detroit, MI (US)

(72) Inventors: Azeem Sarwar, Rochester Hills, MI (US); Gregory W. Deneszczuk, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 60 days.

(21) Appl. No.: 15/972,564

(22) Filed: May 7, 2018

(65) Prior Publication Data

US 2019/0339054 A1    Nov. 7, 2019

(51) Int. Cl.
*G01B 7/14* (2006.01)
*G01M 13/021* (2019.01)
*G01M 1/16* (2006.01)

(52) U.S. Cl.
CPC ............. *G01B 7/14* (2013.01); *G01M 13/021* (2013.01); *G01M 1/16* (2013.01)

(58) Field of Classification Search
None
See application file for complete search history.

(56) References Cited

U.S. PATENT DOCUMENTS

| 4,894,613 A | * | 1/1990 | Tsugawa | G01P 3/488 324/166 |
| 2003/0178989 A1 | * | 9/2003 | Vig | G01D 5/147 324/207.2 |
| 2014/0001997 A1 | * | 1/2014 | Kim | G01B 7/14 318/490 |

\* cited by examiner

*Primary Examiner* — Jas A Sanghera
(74) *Attorney, Agent, or Firm* — Quinn IP Law

(57) ABSTRACT

A device and associated method for monitoring a rotatable member is described, and includes a target wheel coupled to the rotatable member, and a sensor that is disposed to monitor the target wheel. The sensor is configured to generate a signal associated with rotation of the target wheel. A controller is in communication with the sensor and includes an instruction set that is executable to dynamically monitor the signal generated by the sensor during rotation of the target wheel and determine a magnitude of an airgap between the sensor and the target wheel based upon the signal. A variation in the magnitude of the airgap between the sensor and the target wheel can be determined based upon the signal, and a fault associated with the rotating member can be determined based upon the variation in the magnitude of the airgap.

15 Claims, 3 Drawing Sheets

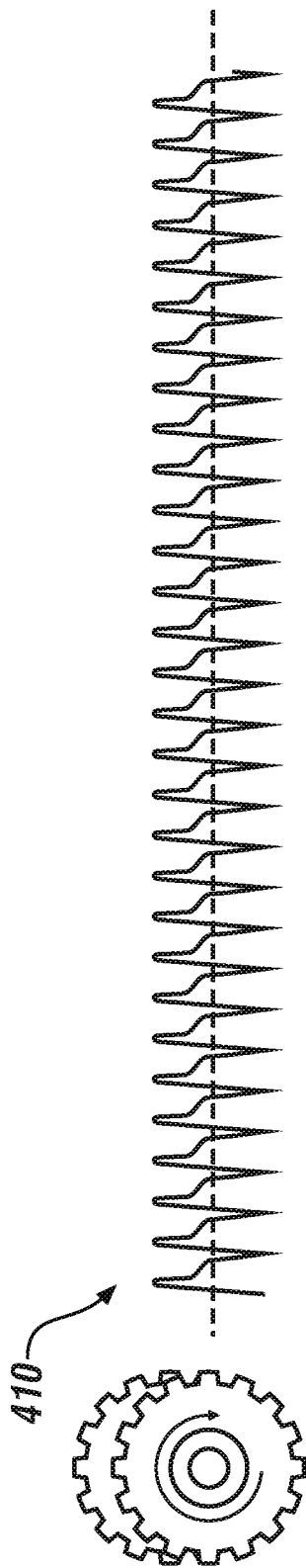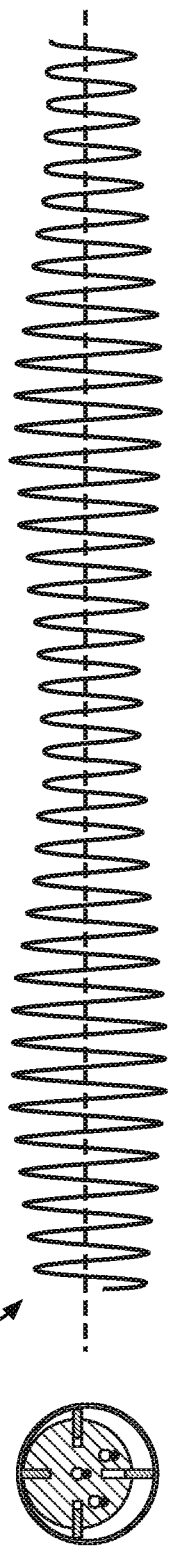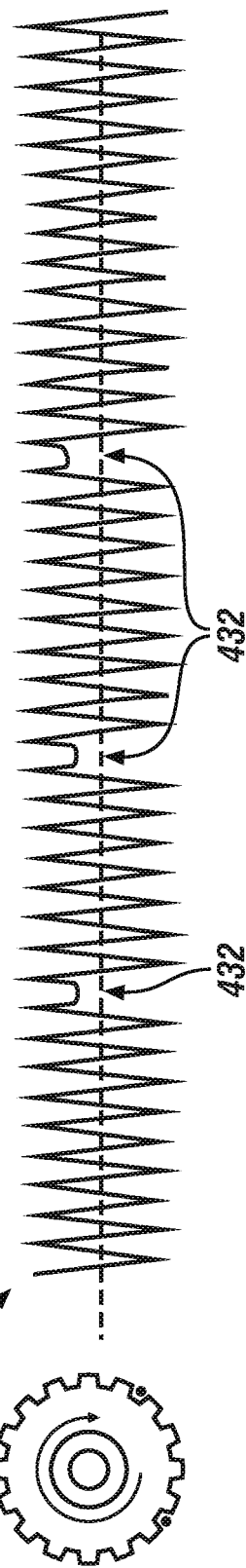

US 10,670,385 B2

METHOD AND APPARATUS FOR MONITORING A ROTATABLE MEMBER

INTRODUCTION

Engines, transmissions, electric motors, water pumps, alternators and other devices include rotatable members and other shafts that are mounted on bearing surfaces and rotate therein to transfer mechanical power in the form of torque and speed.

SUMMARY

A device and associated method for monitoring a rotatable member is described, and includes a target wheel coupled to the rotatable member, and a sensor that is disposed to monitor the target wheel. The sensor is configured to generate a signal associated with rotation of the target wheel. A controller is in communication with the sensor and includes an instruction set that is executable to dynamically monitor the signal generated by the sensor during rotation of the target wheel and determine a magnitude of an airgap between the sensor and the target wheel based upon the signal. A variation in the magnitude of the airgap between the sensor and the target wheel may be determined based upon the signal, and a fault associated with the rotating member may be determined based upon the variation in the magnitude of the airgap.

An aspect of the disclosure includes the sensor being a Hall effect sensor.

Another aspect of the disclosure includes the sensor being configured to generate an analog signal that is associated with rotation of the target wheel.

Another aspect of the disclosure includes the target wheel being a ferrous metal target wheel.

Another aspect of the disclosure includes the instruction set being executable to determine parameters associated with nominal operation of the rotatable member, and detect an anomaly in the magnitude of the airgap between the sensor and the target wheel based upon the dynamically monitored signal that is generated by the sensor and the parameters associated with the nominal operation of the rotatable member.

Another aspect of the disclosure includes the instruction set being executable to detect a shift in the location of the rotating member.

Another aspect of the disclosure includes the instruction set being executable to detect oscillation in the rotating member.

Another aspect of the disclosure includes the instruction set being executable to detect the presence of a foreign object in the rotating member.

Another aspect of the disclosure includes the instruction set being executable to detect an impending fault in the rotating member.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 4-1 graphically shows one example of time-based signals output from an embodiment of the sensor arranged to monitor the target wheel at a preset airgap under nominal operating conditions, in accordance with the disclosure;

FIG. 4-2 graphically shows another example of time-based signals output from an embodiment of the sensor arranged to monitor the target wheel at a preset airgap under operating conditions that include wobbling of the rotatable member, in accordance with the disclosure;

FIG. 4-3 graphically shows another example of time-based signals output from an embodiment of the sensor arranged to monitor the target wheel at a preset airgap under operating conditions that include the presence of debris in the target wheel, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
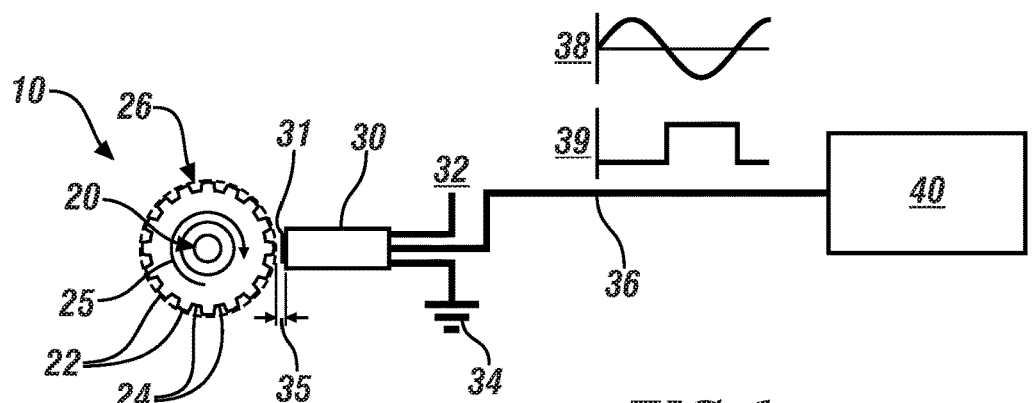
FIG. 1 schematically shows a target wheel coupled to a rotatable member and a sensor arranged to monitor the target wheel, in accordance with the disclosure.

Referring to the drawings, wherein like reference numerals correspond to like or similar components throughout the several Figures, FIG. 1, consistent with embodiments disclosed herein, illustrates an end-view of a rotatable member 10 having a target wheel 20 coupled thereto. A sensor 30 is mounted in relation to the target wheel 20 in a manner that permits the sensor 30 to monitor rotation of the target wheel 20, and hence monitor rotation of the rotatable member 10. The sensor 30 may be configured as a Hall effect gear tooth sensor that is separated from the target wheel 20 by an airgap 35 in one embodiment. The sensor 30 is electrically connected to and powered by a DC power source 32, with an associated ground 34. The sensor 30 has a signal line 36 that is in communication with an I/O (input/output) port of a controller 40. Rotation of the target wheel 20 is indicated by arrow 25.

The rotatable member 10 may be a rigid shaft that is mounted in one or more bearing surfaces and is disposed to transfer torque and/or rotational position in an associated device. The rotatable member 10 can include, by way of example, an engine crankshaft, a transmission shaft, a driveshaft or halfshaft of a driveline, a wheel axle, a shaft on an air conditioning compressor, a shaft on an alternator, a shaft attached to a rotor of an electric machine, a pulley shaft, etc.

The target wheel 20 may be configured in one embodiment as a disc-shaped device fabricated from ferrous metal and having a circular outer periphery 26 that includes a plurality of outwardly projecting teeth 22 with valleys 24 interposed on each side. The teeth 22 and valleys 24 are configured with square cross-sections in one embodiment. The quantity, size, spacing and cross-sectional shape of the teeth 22 and interposed valleys 24 are application-specific, and not detailed herein.

The sensor 30 is a Hall effect gear tooth sensor that includes a magnetic sensing element 31 in one embodiment. The sensor 30 is arranged to have its sensing element 31 mounted on or near its outer surface in a manner that is radially outwardly disposed in relation to the projecting teeth 22 and valleys 24 of the target wheel 20 in one embodiment. The airgap 35 may be defined as a radial distance between the outer periphery 26 of the target wheel 20 and the sensing element 31 of the sensor 30. Alternatively, the teeth 22 and valleys 24 of the target wheel 20 are disposed as radial elements that are cut into, etched onto or otherwise disposed on one face of the target wheel 20, and the sensor 30 is arranged to have its sensing element 31 mounted near the outer periphery 26 in a manner that is adjacent to the projecting teeth 22 and valleys 24 of the target wheel 20. Alternatively, the target wheel 20 configured as a tone wheel having radially-disposed magnetic strips (not shown), and the sensor 30 is arranged to have its sensing element 31 mounted near the outer periphery 26 in a manner that is adjacent to the magnetic strips of the target wheel 20.

Rotation of the rotatable member 10 causes the projecting teeth 22 and valleys 24 of the target wheel 20 to pass near the magnetic sensing element 31 of the sensor 30. The approach of one of the rotating projecting teeth 22 to the magnetic sensing element 31 serves to concentrate magnetic flux in the magnetic sensing element 31, which can be monitored by an electronic circuit that is internal to the sensor 30. The magnetic sensing element 31 generates an analog signal 38, an example of which is graphically shown in relation to a linearized depiction of one of the projecting teeth 22. The analog signal 38 is communicated to the controller 40, which executes signal processing to generate a square wave output 39 that can be used for determining rotational position and speed of the rotatable member 10. In one embodiment, the sensor 30 communicates the analog signal 38 to the controller 40 via the signal line 36. In one embodiment, the sensor 30 includes signal processing capability to generate the square wave output 39, and the square wave output 39 and the analog signal 38 are communicated to the controller 40 via the signal line 36. The square wave output 39 and the analog signal 38 may be communicated to the controller 40 via the signal line 36 by encoding the analog signal 38 onto the square wave output 39.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
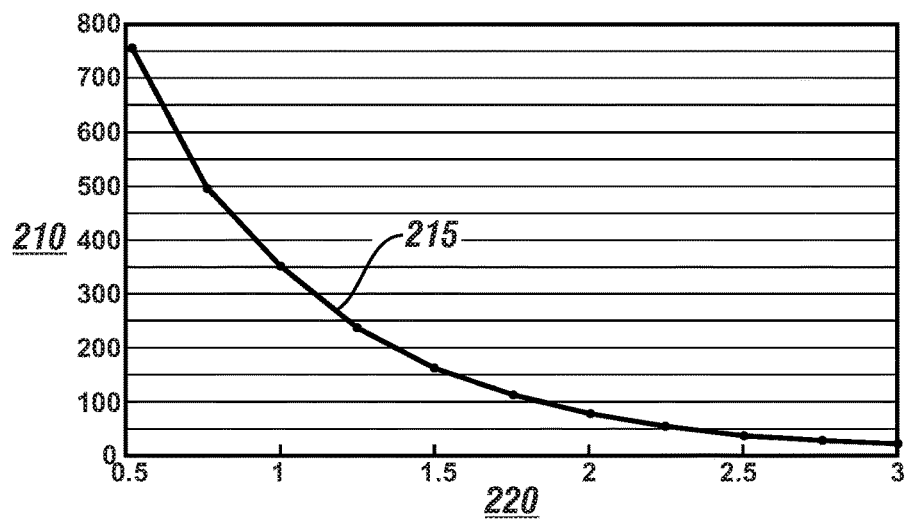
FIG. 2 graphically shows a relationship between an airgap between a sensor and a target wheel and a peak-to-peak differential in a signal output from the sensor, in accordance with the disclosure.

FIG. 2 graphically shows a magnitude of peak-to-peak signal output 215 associated with the analog signal 38 that is generated by an embodiment of the sensor 30, indicated on the vertical axis 210, which is plotted in relation to magnitude of the airgap 35, which is indicated on the horizontal axis 220. The relation between the peak-to-peak signal output 215 and the magnitude of the airgap 35 is non-linearly negative, with the peak-to-peak signal output 215 increasing with a decrease in the airgap 35 and decreasing with an increase in the airgap 35.

Figure 3:
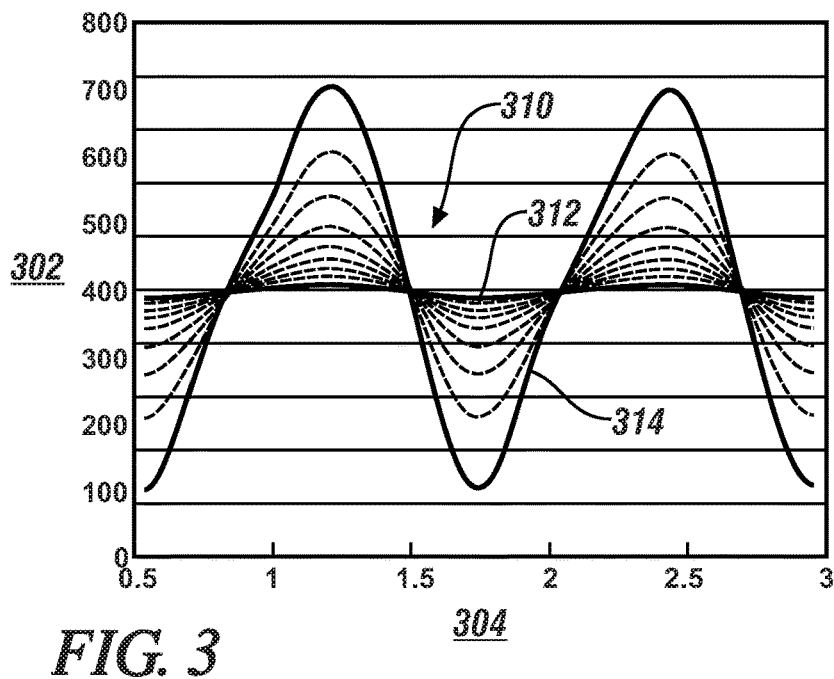
FIG. 3 graphically shows time-based signals that are output from an embodiment of the sensor arranged to monitor the target wheel at various airgap settings, in accordance with the disclosure.

FIG. 3 graphically shows a plurality of analog signals 310 that are output from an embodiment of the sensor 30 during rotation of the target wheel 20, plotted as a magnitude of peak-to-peak voltage differential 302 in relation to gear rotation 304, in rotational degrees. As shown, the rotation of the target wheel 20 includes rotation past two of the teeth and corresponding valleys. The analog signals 310 are associated with varying magnitudes of the airgap 35, including a minimum airgap 312, which is 0.50 mm as shown, and a maximum airgap 314, which is 3.0 mm as shown. These results indicate that the peak-to-peak voltage differential 302 increases with a decrease in the airgap 35 between the sensor 30 and the target wheel 20.

Rotating members such as shafts are mounted on bearings that serve to reduce rotational friction, support a load, and guide a moving part. Example types of bearings can include sleeve bearings, roller bearings, hub bearings, etc. Misassembly, in-use wear and other faults associated with a rotating member and a bearing can cause a cascading series of faults for the rotating member and the system in which it is disposed if undetected. When the rotating member 10 is disposed in a geartrain or a torque transmission device, various components such as rotating members, gears, clutches, pulleys, etc. may interact, and changes in wear, deterioration, and a variety of faults may be transmitted and detected in a manner that is manifested in a variation in the airgap 35 and thus detectable by monitoring it. This allows for application-specific customizability in signal evaluation, detection, and fault diagnosis.

The raw, unfiltered analog signal 38 from the sensor 30 facilitates real-time, dynamic monitoring of a magnitude of the airgap 35 between the sensor 30 and the target wheel 20, including monitoring a dynamic change in the magnitude of the airgap 35 between the sensor 30 and the target wheel 20. The dynamic change in the magnitude of the airgap 35 between the sensor 30 and the target wheel 20 can be analyzed to determine a dynamic change in the lateral and/or radial movement of the rotating member 10 on which the target wheel 20 is attached, which can be associated with wear, degradation, deterioration in the rotating member 10, one or more bearings in which the rotating member 10 is mounted, the Hall effect sensor 30 and/or the target wheel 20. This enables early detection of various faults in many components, e.g. off-centered rotation, wobbling, presence of debris etc.

FIG. 4-1 graphically shows analog signal data 410 that is output from an embodiment of the sensor 30 that is monitoring rotation of an embodiment of the target wheel 20, wherein the relevant bearing surfaces and gear interactions are operating in accordance with their specification.

FIG. 4-2 graphically shows analog signal data 420 that is output from an embodiment of the sensor 30 that is monitoring rotation of an embodiment of the target wheel 20, wherein there is a magnitude of wear in one of the bearing surfaces that results in a wobbling of the rotating member 10 within the bearing. The wobbling effect results in a variation in the airgap 35, which can be indicated by a variation in the amplitude of the analog signal 38 that is output from the Hall effect sensor. As shown, there is a secondary frequency in the analog signal 38 that is output from the sensor 30, which can be detected employing some form of signal analysis such as Fourier transform (FFT) analysis, or another analytical method that decomposes a signal into its base frequencies. This data is one non-limiting example.

FIG. 4-3 graphically shows analog signal data 430 that is output from an embodiment of the sensor 30 that is monitoring rotation of an embodiment of the target wheel 20, wherein there is debris present in the target wheel 20. The debris results in a variation in the airgap 35, which can be indicated by a variation in the amplitude of the analog signal 38 that is output from the sensor 30 at specific points in rotation of the target wheel 20. As shown, there are missing elements 432, e.g., dips in the analog signal 38 that is output from the sensor 30, which can be detected employing some form of signal analysis such as Fourier transform analysis.

Figure 5:
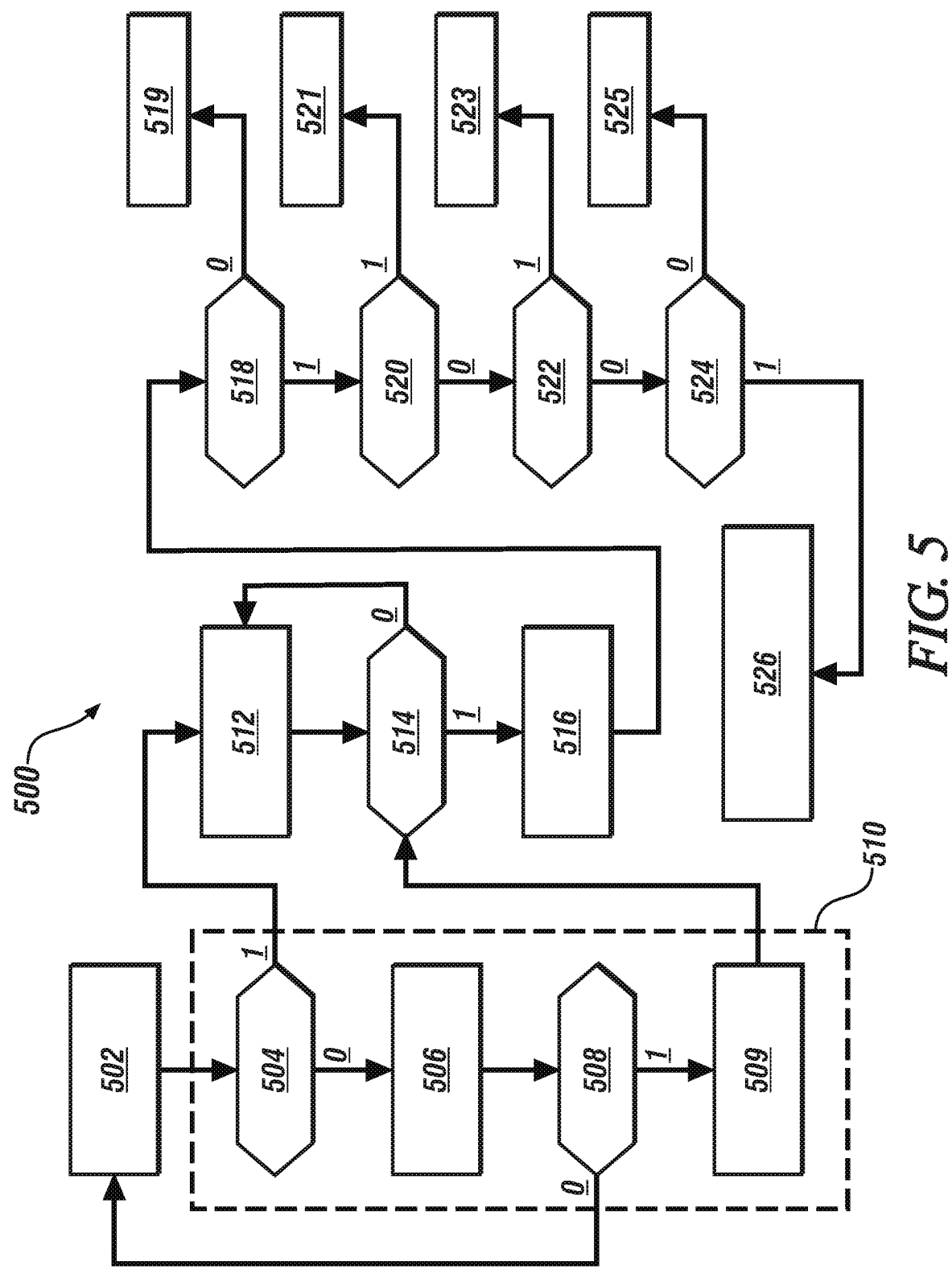
FIG. 5 schematically shows a monitoring routine for evaluating an embodiment of the rotatable member by dynamically monitoring an analog signal that is generated by the sensor in response to rotation of the target wheel that is attached to the rotatable member, in accordance with the disclosure.

FIG. 5 schematically shows a monitoring routine 500 for evaluating an embodiment of the rotatable member 10 and the associated system by dynamically monitoring the analog signal 38 that is generated by the sensor 30 in response to rotation of the target wheel 20 that is attached to the rotatable member 10. As is appreciated, the referenced associated system may include the rotating member 10, one or more bearings in which the rotating member 10 is mounted, other rotating or fixed devices to which the rotating member 10 may be coupled to effect rotational speed transfer or torque transfer, the sensor 30 and/or the target wheel 20. Table 1 is provided as a key wherein the numerically labeled blocks and the corresponding functions are set forth as follows, corresponding to the monitoring routine 500. The teachings may be described herein in terms of functional and/or logical block components and/or various processing steps. It should be realized that such block components may be composed of hardware, software, and/or firmware components that have been configured to perform the specified functions, and may be executed in the controller 40, or in another controller.

TABLE 1

| BLOCK | BLOCK CONTENTS |
|---|---|
| 502 | Collect analog data from speed sensor |
| 510 | Initialization process |
| 504 | Has system been initialized? |
| 506 | Collect signal information and statistics |
| 508 | Is there enough data to establish nominal behavior? |
| 509 | Establish nominal behavior |
| 512 | Compare speed sensor data with nominal behavior |
| 514 | Does speed sensor data deviate from the nominal behavior? |
| 516 | Detect transmission anomaly |
| 518 | Is speed anomaly gradually increasing? |
| 519 | Detect fault |
| 520 | Has speed signal amplitude changed |
| 521 | Detect fault |
| 522 | Is speed signal amplitude oscillating? |
| 523 | Detect fault |
| 524 | Is speed signal peak-to-peak transition incomplete? |
| 525 | Detect fault |
| 526 | Component degradation indicated. |

Execution of the monitoring routine 500 may proceed as follows. The steps of the monitoring routine 500 may be executed in a suitable order, and are not limited to the order described with reference to FIG. 5. As employed herein, the term "1" indicates an answer in the affirmative, or "YES", and the term "0" indicates an answer in the negative, or "NO".

The analog signal 38 from the sensor 30 is dynamically monitored, collected and evaluated during operation (502). There may be a need to initialize operation if such action has not previously been undertaken (504)(0). When the system has been initialized (504)(1), signal evaluation as described with steps 512, et seq. occurs.

An initialization routine 510 includes collecting and analyzing the analog signal 38 generated by the sensor 30 when the rotatable member 10 is rotating under conditions that indicate that the system is within allowable tolerances, i.e., within specification. The analysis includes dynamically gathering information related to the analog signal 38 and determining associated parameters (506), with such parameters including, by way of non-limiting example, peak-to-peak amplitudes, variations in the peak-to-peak amplitude that may correlate to a rotational position of the rotating member 10, speed-based variations in the peak-to-peak amplitude, and other parameters that may be determined by subjecting the analog signal 38 to analytical methods. This information may be associated with operation at a single speed, or operation at different speeds over a range of speeds. The initialization data is gathered until a sufficient quantity of data is captured to determine and establish parameters that are associated with nominal operation (508)(0). As employed herein, determining parameters that are associated with nominal operation include determining parameters associated with the analog signal 38 under preset operating conditions when the sensor 30 and the rotatable member 10 are rotating under preset conditions in the absence of a fault in either the sensor 30, the rotatable member 10, or the associated system in which the rotatable member 10 is operating. The system initialization 510 may be executed in real-time, or may be executed and provided as a calibration that is stored in a memory device of the controller 40. When sufficient quantity of data is captured (508)(1), parameters that are associated with nominal operation are established, and operation of the initialization routine ends (509).

After the system has been initialized (504)(1), analog signal data is dynamically captured and compared with the parameters that are associated with nominal operation (512) to detect whether there is a variation (514) that may indicate an anomaly in the rotatable member 10 (516). The monitoring routine 500 executes to monitor and determine, based upon the analog signal 38, a magnitude of the airgap 35 between the Hall effect gear tooth sensor 30 and the target wheel 20, and detect variation in the magnitude of the airgap 35 between the Hall effect gear tooth sensor 30 and the target wheel 20 based thereon. A fault associated with the rotatable member 10 may be determined based upon the variation in the magnitude of the airgap 35. This may include the following steps.

If there is no variation in the analog signal data (514)(0), data acquisition and analysis continues. If so (514)(1), the variation indicating an anomaly in the rotatable member 10 is analyzed (516) in order to more closely identify a root cause for the anomaly in the rotatable member 10. Such analysis can include Fourier transform analysis or other signal decomposition techniques, all of which are included without limitation.

The variation in the parameters associated with the analog signal 38 indicating an anomaly in the rotatable member 10 can take various forms, depending upon the mounting structure, bearing surface and other factors that are associated with the rotatable member 10 and the interconnections associated therewith. As such, the following analytical techniques are examples, and are not intended to be exhaustive.

When the data analysis indicates that the anomaly in the rotatable member 10 is a sudden change (518)(0), the controller 40 may detect an impending fault that requires immediate attention, with a corresponding illumination of an indicator lamp and other communication to warn an operator or technician (519).

When the anomaly in the rotatable member 10 is gradually but monotonically increasing (518)(0), such as an increase in the amplitude of the analog signal 38 (520)(1) this may indicate an upward, downward of sideward shift in the location of the target wheel 20 and the rotatable member 10 in relation to the sensor 30, and the controller 40 may detect a fault that requires attention, with a corresponding illumination of an indicator lamp and other communication to warn an operator or technician (521).

When the anomaly in the rotatable member 10 is oscillating (522)(1), this may indicate wobbling of the target wheel 20 and the rotatable member 10 in relation to the sensor 30, and the controller 40 may detect a fault that requires attention, with a corresponding illumination of an indicator lamp and other communication to warn an operator or technician (523).

When the anomaly in the rotatable member 10 indicates that there is an occasional or periodic incomplete peak-to-peak transition in the analog signal 38 (524)(1), this may indicate presence of a foreign object in the target wheel 20 or the rotatable member 10, and the controller 40 may detect a fault that requires attention, with a corresponding illumination of an indicator lamp and other communication to warn an operator or technician (525).

When the anomaly in the rotatable member 10 is not indicated by oscillation, an increase in the amplitude of the analog signal 38, or absence of an occasional or periodic incomplete peak-to-peak transition in the analog signal 38 (524)(0), this may indicate another fault associated with component degradation or wear, and the controller 40 may detect a fault that requires attention, with a corresponding illumination of an indicator lamp and other communication to warn an operator or technician (526).

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A device for monitoring a rotatable member, comprising:
   a target wheel coupled to the rotatable member;
   a sensor disposed to monitor the target wheel, wherein the sensor is configured to generate an analog signal associated with rotation of the target wheel;
   a controller, in communication with the sensor, the controller including an instruction set that is executable to:
   execute an initialization routine to determine parameters associated with nominal operation of the rotatable member based upon the analog signal that is associated with rotation of the target wheel, wherein the parameters associated with nominal operation of the rotatable member include a peak-to-peak amplitude, a speed-based variation in the peak-to-peak amplitude, and a variation in the peak-to-peak amplitude that correlates to a rotational position of the rotatable member,
   dynamically monitor the analog signal generated by the sensor during rotation of the target wheel,
   determine a magnitude of an airgap between the sensor and the target wheel based upon the dynamically monitored analog signal that is generated by the sensor,
   detect an anomaly in the magnitude of the airgap between the sensor and the target wheel based upon the dynamically monitored analog signal and the parameters associated with the nominal operation of the rotatable member, and
   detect a fault associated with the rotatable member based upon the anomaly in the magnitude of the airgap.

2. The device of claim 1, wherein the sensor comprises a Hall effect sensor.

3. The device of claim 1, wherein the target wheel comprises a ferrous metal target wheel.

4. The device of claim 1, wherein the instruction set executable to detect a fault associated with the rotatable member based upon the anomaly in the magnitude of the airgap comprises the instruction set being executable to detect a shift in a location of the rotatable member in relation to the sensor.

5. The device of claim 1, wherein the instruction set executable to detect a fault associated with the rotatable member based upon the anomaly in the magnitude of the airgap comprises the instruction set being executable to detect wobbling of the target wheel when the analog signal indicates an oscillation in the rotatable member.

6. The device of claim 1, wherein the instruction set executable to detect a fault associated with the rotatable member based upon the anomaly in the magnitude of the airgap comprises the instruction set being executable to detect presence of a foreign object in the rotatable member when the dynamically monitored analog signal indicates an incomplete peak-to-peak transition in the analog signal.

7. The device of claim 1, wherein the instruction set executable to detect a fault associated with the rotatable member based upon the anomaly in the magnitude of the airgap comprises the instruction set being executable to detect an impending fault in the rotatable member.

8. A device for monitoring a rotatable member, comprising:
   a ferrous metal target wheel coupled to the rotatable member;
   a Hall effect gear tooth sensor disposed to monitor the ferrous metal target wheel, wherein the Hall effect gear tooth sensor is configured to generate an analog signal associated with rotation of the ferrous metal target wheel;
   a controller, in communication with the Hall effect gear tooth sensor, the controller including an instruction set executable to:
   execute an initialization routine to determine parameters associated with nominal operation of the rotatable member based upon the analog signal that is associated with rotation of the ferrous metal target wheel, wherein the parameters associated with nominal operation of the rotatable member include a peak-to-peak amplitude, a speed-based variation in the peak-to-peak amplitude, and a variation in the peak-to-peak amplitude that correlates to a rotational position of the rotatable member,
   dynamically monitor the analog signal during rotation of the ferrous metal target wheel,
   determine a magnitude of an airgap between the Hall effect gear tooth sensor and the ferrous metal target wheel based upon the analog signal,
   detect a variation in the magnitude of the airgap between the Hall effect gear tooth sensor and the ferrous metal target wheel based upon the analog signal and the parameters associated with the nominal operation of the rotatable member, and
   detect a fault associated with the rotatable member based upon the variation in the magnitude of the airgap.

9. A method for monitoring a rotatable member, comprising:
   monitoring, via a sensor disposed to monitor a target wheel coupled to the rotatable member, an unfiltered analog signal generated by the sensor during rotation of the rotatable member;
   executing an initialization routine to determine parameters associated with nominal operation of the rotatable member based upon the unfiltered analog signal, wherein the parameters associated with nominal operation of the rotatable member include a peak-to-peak amplitude, a speed-based variation in the peak-to-peak amplitude, and a variation in the peak-to-peak amplitude that correlates to a rotational position of the rotatable member;
   determining a magnitude of an airgap between the sensor and the target wheel based upon the unfiltered analog signal;
   detecting a variation in the magnitude of the airgap between the sensor and the target wheel based upon the unfiltered analog signal;
   detecting an anomaly based upon the variation in the magnitude of the airgap between the sensor and the target wheel and the parameters associated with the nominal operation of the rotatable member;

detecting a fault associated with the rotatable member based upon the anomaly; and communicating, via a controller, the detected fault to an operator.

10. The method of claim 9, wherein the sensor comprises a Hall effect sensor.

11. The method of claim 9, further comprising dynamically monitoring, via the controller, the unfiltered analog signal during rotation of the target wheel.

12. The method of claim 9, comprising detecting a shift in the location of the rotatable member to detect a shift in a location of the rotatable member in relation to the sensor based upon the variation in the magnitude of the airgap between the sensor and the target wheel.

13. The method of claim 9, comprising detecting wobbling of the target wheel when the unfiltered analog signal indicates an oscillation in the rotatable member that is determined based upon the variation in the magnitude of the airgap between the sensor and the target wheel.

14. The method of claim 9, comprising detecting presence of a foreign object in the rotatable member based upon the variation in the magnitude of the airgap between the sensor and the target wheel when the unfiltered analog signal indicates an incomplete peak-to-peak transition in the unfiltered analog signal.

15. The method of claim 9, comprising detecting an impending fault in the rotatable member based upon the variation in the magnitude of the airgap between the sensor and the target wheel.

* * * * *